US012672008B2

(12) United States Patent
Sunila et al.

(10) Patent No.: US 12,672,008 B2
(45) Date of Patent: Jun. 30, 2026

(54) DETERMINING COUNTERACTIONS FOR REMEDYING NETWORK ANOMALIES

(71) Applicant: Elisa Oyj, Helsinki (FI)

(72) Inventors: Karri Sunila, Helsinki (FI); Veijo Höykinpuro, Helsinki (FI); Riku Ertimo, Helsinki (FI)

(73) Assignee: ELISA OYJ, Helsinki (FI)

( * ) Notice: Subject to any disclaimer, the term of this patent is extended or adjusted under 35 U.S.C. 154(b) by 349 days.

(21) Appl. No.: 18/565,658

(22) PCT Filed: Apr. 5, 2023

(86) PCT No.: PCT/FI2023/050191
§ 371 (c)(1),
(2) Date: Nov. 30, 2023

(87) PCT Pub. No.: WO2023/198956
PCT Pub. Date: Oct. 19, 2023

(65) Prior Publication Data
US 2024/0267747 A1 Aug. 8, 2024

(30) Foreign Application Priority Data
Apr. 14, 2022 (FI) ..................................... 20225327

(51) Int. Cl.
H04W 16/18 (2009.01)
H04B 7/06 (2006.01)
(Continued)

(52) U.S. Cl.
CPC .......... *H04W 16/18* (2013.01); *H04B 7/0632* (2013.01); *H04L 41/0631* (2013.01);
(Continued)

(58) Field of Classification Search
CPC ..... H04W 16/18; H04W 16/28; H04W 24/00; H04W 24/02; H04W 24/04; H04B 7/0632; H04L 41/0631; H04L 41/064; H04L 43/16
See application file for complete search history.

(56) References Cited

U.S. PATENT DOCUMENTS

2016/0103838 A1 4/2016 Sainani et al.
2016/0135067 A1 5/2016 Morad et al.
(Continued)

FOREIGN PATENT DOCUMENTS

EP 2498435 A2 9/2012
FI 129289 B 11/2021
(Continued)

OTHER PUBLICATIONS

Search Report dated Oct. 31, 2022 for corresponding FI patent application No. 20225327 (2 pages).
(Continued)

*Primary Examiner* — Michael A Keller
*Assistant Examiner* — Chhian (Amy) Ling
(74) *Attorney, Agent, or Firm* — Carroll, Hoette & Butscher, LLC; Christopher R. Carroll

(57) ABSTRACT

Example embodiments relate to counteractions for remedying anomalies within a communication network. A computer-implemented method may comprise detecting an anomaly associated with at least a first cell; determining a counteraction for the first cell; identifying at least one second cell impacted by the counteraction; obtaining first performance indicator(s) the first cell and/or the at least one second cell, wherein the first performance indicator(s) are associated with a first time period before performance of the counteraction; causing performance of the counteraction at the first cell or providing an indication of the counteraction
(Continued)

for performance of the counteraction at the first cell by a user; obtaining second performance indicator(s) associated with the first cell and/or the at least one second cell, wherein the second performance indicator(s) are associated with a second time period after performance of the counteraction; and verifying the counteraction based on first performance indicator(s) and the second performance indicator(s).

14 Claims, 6 Drawing Sheets

(51) Int. Cl.
| *H04L 41/0631* | (2022.01) |
| *H04L 43/16* | (2022.01) |
| *H04W 16/28* | (2009.01) |
| *H04W 24/00* | (2009.01) |
| *H04W 24/02* | (2009.01) |
| *H04W 24/04* | (2009.01) |

(52) U.S. Cl.
CPC ............ *H04L 41/064* (2013.01); *H04L 43/16* (2013.01); *H04W 16/28* (2013.01); *H04W 24/00* (2013.01); *H04W 24/02* (2013.01); *H04W 24/04* (2013.01)

(56) References Cited

U.S. PATENT DOCUMENTS

| 2020/0084087 | A1* | 3/2020 | Sharma ................. | H04W 24/08 |
| 2021/0351973 | A1 | 11/2021 | Ford et al. | |
| 2021/0357281 | A1* | 11/2021 | Malboubi ............. | G06F 11/079 |
| 2021/0377811 | A1 | 12/2021 | Singh et al. | |
| 2022/0014424 | A1* | 1/2022 | Yadav ...................... | G06N 5/04 |
| 2022/0237069 | A1* | 7/2022 | Freeman ............. | G06F 11/3409 |
| 2022/0286369 | A1* | 9/2022 | Lee ..................... | H04L 41/5009 |
| 2022/0361066 | A1* | 11/2022 | Jia ......................... | H04W 48/18 |
| 2023/0188408 | A1* | 6/2023 | Pick ........................ | H04L 41/16 |
| | | | | 709/224 |

FOREIGN PATENT DOCUMENTS

| WO | 2021064282 A1 | 4/2021 |
| WO | 2021079322 A1 | 4/2021 |
| WO | 2021219930 A1 | 11/2021 |

OTHER PUBLICATIONS

Office Action dated Oct. 31, 2022 for corresponding FI patent application No. 20225327 (12 pages).
International Search Report mailed Jul. 4, 2023 for corresponding patent application No. PCT/FI2023/050191 (4 pages).
Written Opinion of the International Searching Authority mailed Jul. 4, 2023 for corresponding patent application No. PCT/FI2023/050191 (9 pages).
ETSI GS ZSM 002 V1.1.1 (Aug. 2019) Zero-touch network and Service Management (ZSM); Reference Architecture. [online], Aug. 13, 2019. (80 pages).

* cited by examiner

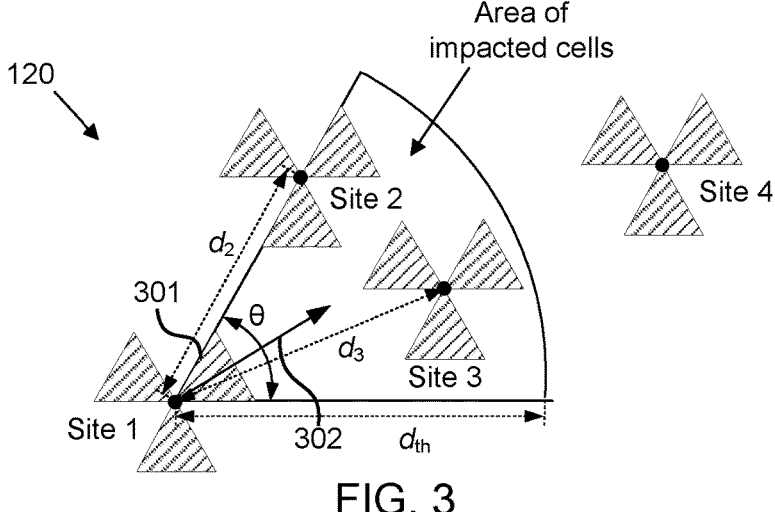

FIG. 3

| Anomaly scope | Counteraction | Verification flow |
|---|---|---|

KPIs

CQI

TA

RSRP

Anomaly scope

401
Bad CQI in individual cell

402
Bad CQI in cells sharing antenna port

403
Bad CQI in cells sharing radio

404
Bad CQI in whole sector

405
Bad CQI at whole site

Counteraction

411
Tilting

412
Check/replace antenna

413
Check/replace radio

414
Check/replace other HW

415
Replan site location

Verification flow

421 — Yes / No

422 — Yes / No

423 — Yes / No

424 — Yes / No

425 — Yes / No

431
Counteraction verified

432
Counteraction not verified

FIG. 4

DETERMINING COUNTERACTIONS FOR REMEDYING NETWORK ANOMALIES

CROSS-REFERENCE TO RELATED APPLICATIONS

This application is a national phase entry of and claims priority to International Patent Application No. PCT/FI2023/050191 (filed 5 Apr. 2023), which claims priority to Finnish Patent Application No. 20225327 (filed 14 Apr. 2022), the entire contents of which are incorporated herein by reference.

TECHNICAL FIELD

Various example embodiments generally relate to the field of wireless communications. Some example embodiments relate to determining counteractions for remedying anomalies within a wireless communication network.

BACKGROUND

A wireless communication network may be analysed and optimized in many different ways, for example based on key performance indicators (KPI) of the network. An example of a KPI is the channel quality indicator (CQI). Finding a root cause for performance degradation may be one target in network optimization. Finding the root cause and determining corresponding actions may be however challenging due to the variety of performance indicators and possible network configurations.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

Example embodiments of the present disclosure enable to improve operation of a wireless communication network. This benefit may be achieved by the features of the independent claims. Further example embodiments are provided in the dependent claims, the description, and the drawings.

According to a first aspect, a computer-implemented method comprises: detecting an anomaly associated with at least a first cell of a communication network; determining a counteraction for the first cell for remedying the anomaly; identifying at least one second cell of the communication network impacted by the counteraction; obtaining one or more first performance indicators of at least one of the first cell and the at least one second cell, wherein the one or more first performance indicators are associated with a first time period before performance of the counteraction; causing performance of the counteraction at the first cell or providing an indication of the counteraction for performance of the counteraction at the first cell by a user; obtaining one or more second performance indicators associated with the at least one of the first cell and the at least one second cell, wherein the one or more second performance indicators are associated with a second time period after performance of the counteraction; and verifying the counteraction based on the one or more first performance indicators and the one or more second performance indicators.

According to an example embodiment of the first aspect, the method may further comprise: determining the counteraction based on a scope of the anomaly.

According to an example embodiment of the first aspect, the scope of the anomaly comprises a single cell and the counteraction comprises changing an antenna tilt of the first cell, the scope of the anomaly comprises a plurality of cells sharing an antenna port and the counteraction comprises replacement of at least one antenna element associated with the antenna port, the scope of the anomaly comprises a plurality of cells sharing a radio and the counteraction comprises replacement of the radio, the scope of the anomaly comprises a sector of an access node and the counteraction comprises replacement of components common to cells of the sector, or the scope of the anomaly comprises the access node and the counteraction comprises providing an indication of a need to replan location of the access node.

According to an example embodiment of the first aspect, identifying the at least one second cell is based on determining that the at least one second cell shares an antenna of the first cell or a radio of the first cell.

According to an example embodiment of the first aspect, identifying the at least one second cell is further based on at least one of: determining that the at least one second cell is within the same sector or beam as the first cell, determining that the at least one second cell overlaps in frequency with the first cell, or determining that the at least one second cell is within a threshold distance from the first cell, the threshold distance corresponding to an n-th percentile of timing advance values of the first cell.

According to an example embodiment of the first aspect, verifying the counteraction comprises: calculating a first difference between the one or more first performance indicators and the one or more second performance indicators of the first cell and the at least one second cell; and providing an indication of improved network performance, in response to determining that the first difference is higher than or equal to a first threshold, providing an indication of degraded network performance, in response to determining that the first difference is lower than or equal to a second threshold, or calculating a second difference between the one or more first performance indicators and the one or more second performance indicators of the first cell, in response to determining that the first difference is between the first threshold and the second threshold.

According to an example embodiment of the first aspect, verifying the counteraction further comprises: providing the indication of improved network performance, in response to determining that the second difference is higher than or equal to a third threshold, providing the indication of degraded network performance, in response to determining the second difference to be lower than or equal to a fourth threshold, or providing an indication of substantially maintained network performance, in response to determining the second difference to be between the third threshold and the fourth threshold.

According to an example embodiment of the first aspect, the method may further comprise: reversing the counteraction, in response to the indication of degraded network performance, or maintaining the counteraction, in response to the indication of improved network performance.

According to an example embodiment of the first aspect, detecting the anomaly is based on at least one key performance indicator of the first cell.

According to an example embodiment of the first aspect, the at least one key performance indicator of the first cell comprises at least one of: a channel quality indicator, a timing advance, or a reference signal received power.

According to an example embodiment of the first aspect, the first and second performance indicators comprise values of a channel quality indicator.

According to an example embodiment of the first aspect, the first and second performance indicators comprise median values of the channel quality indicator.

According to an example embodiment of the first aspect, the indication of the counteraction for performance of the counteraction at the first cell by a user comprises an automated service ticket.

According to a second aspect, an apparatus comprises means for performing any example embodiment of the method of the first aspect.

According to a third aspect, computer program or a computer program product comprises program code configured to, when executed by a processor, cause an apparatus at least to perform any example embodiment of the method of the first aspect.

According to a fourth aspect, an apparatus comprises at least one processor; and at least one memory including computer program code; the at least one memory and the computer code configured to, with the at least one processor, cause the apparatus at least to perform any example embodiment of the method of the first aspect.

Any example embodiment may be combined with one or more other example embodiments. Many of the attendant features will be more readily appreciated as they become better understood by reference to the following detailed description considered in connection with the accompanying drawings.

DESCRIPTION OF THE DRAWINGS

The accompanying drawings, which are included to provide a further understanding of the example embodiments and constitute a part of this specification, illustrate example embodiments and together with the description help to understand the example embodiments. In the drawings:

FIG. 3 illustrates an example of transmission sites and sectors of a radio access network;

FIG. 4 illustrates an example of a CQI-based network optimization method;

Like references are used to designate like parts in the accompanying drawings.

DETAILED DESCRIPTION

Figure 1:
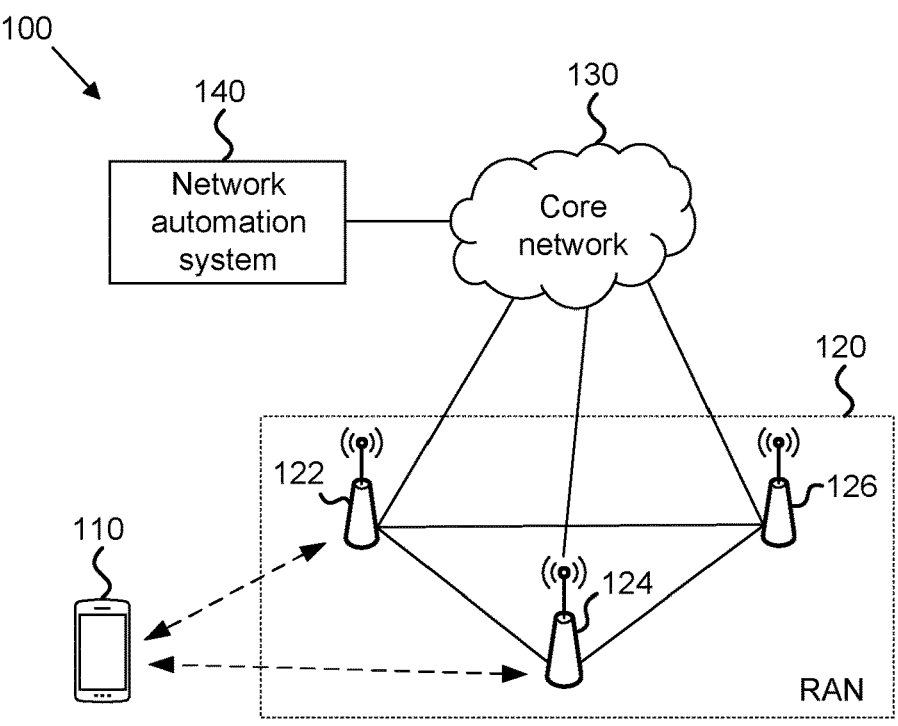
FIG. 1 illustrates an example of a wireless communication network.

Reference will now be made in detail to example embodiments, examples of which are illustrated in the accompanying drawings. The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Operational characteristics of a radio network may be analysed and optimized with many different ways and based on various key performance indicators (KPI). Finding real root causing performance degradation is one target in network optimization. One example of a KPI is the channel quality indicator (CQI), which may be used for example when trying to find real root causes for performance degradation. CQI may indicate the most spectrally efficient modulation and coding rate (MCS) applicable for achieving a certain error rate for given channel conditions. A low CQI may indicate bad radio performance while a higher CQI may indicate better radio performance.

In holistic CQI based RF (radio frequency) optimization, CQI distributions and/or their changes may be analysed in order to determine next actions in network optimization. Such analysis may consider for example common nominators for performance degradation anomalies, for example in terms of antenna ports, radio units and ports, sectors of a transmission site, or transmission sites. This enables to determine a counteraction that has a high probability of remedying the anomaly. Effectivity of the counteraction may be however verified in order to determine whether to maintain or reverse the counteraction.

According to an example embodiment, a computer-implemented method may comprise: detecting an anomaly associated with at least a first cell; determining a counteraction for the first cell; identifying at least one second cell impacted by the counteraction; obtaining first performance indicator(s) the first cell and/or the at least one second cell, wherein the first performance indicator(s) are associated with a first time period before performance of the counteraction; causing performance of the counteraction at the first cell or providing an indication of the counteraction for performance of the counteraction at the first cell by a user; obtaining second performance indicator(s) associated with the first cell and/or the at least one second cell, wherein the second performance indicator(s) are associated with a second time period after performance of the counteraction; and verifying the counteraction based on first performance indicator(s) and the second performance indicator(s).

Therefore, an anomaly associated with a cell of a communication network, as well as at least one suitable counteraction to be applied at that cell, may be determined. Other cell(s) impacted by the counteraction may be identified, for example by comparing performance of the cells (e.g. in terms of CQI) before and after the counteraction. Effectiveness of the counteraction may be thereby verified. With such holistic network performance based optimization method, root causes for network anomalies may be effectively determined and solved. Furthermore, end-to-end visibility to the whole RF chain is provided, including multiple actions for remedying the anomalies. Such analysis may be automated, for example scheduled with certain intervals (e.g. daily), and therefore network optimization may be performed very cost effectively. Considering CQI as a performance indicator, the optimization may not be focused on poor performance cells, but rather be extended to cells having unleveraged potential in terms of data rate, for example if only part of antenna elements of a cell are broken.

FIG. 1 illustrates an example of a wireless communication network. Communication network 100 may comprise one or more devices, which may be also referred to as client nodes, user nodes, or user equipment (UE). An example of a device is UE 110, which may communicate with one or more access nodes of a radio access network (RAN) 120. An access node may be also referred to as an access point or a base station. Access nodes 122, 124, 126 of RAN 120 may for example comprise 5th generation access nodes (gNB). Communications between UE 110 and access nodes 122, 124, 126 may be bidirectional and hence any of these entities may be configured to operate as a transmitter, and/or a receiver.

An access node may provide communication services within one or more cells, which may correspond to a geographical area(s) covered by signals transmitted by the access node. An access node may be equipped an omnidirectional antenna, thereby providing a circular coverage area. It is however possible to apply directive antennas to cover a desired area, e.g. within a sector of a transmission site. It is further possible to apply beamforming such that different UEs are served by different beams of a cell. A cell may be identified by a cell identifier (ID), for example a physical cell ID (PCI). Within a coverage area of a cell, UE 110 may be enabled to access the network via the access node of the cell.

Communication network 100 may further comprise a core network 130, which may comprise various network functions (NF) for establishing, configuring, and controlling data communication sessions of UE 110. A network automation system 140 may be configured to perform network optimization based on various information (e.g. KPIs) gathered form RAN 120 and/or core network 130, as will be further described below.

Communication network 100 may be configured for example in accordance with the 4th or 5th generation (4G, 5G) digital cellular communication network, as defined by the 3rd Generation Partnership Project (3GPP). In one example, communication network 100 may operate according to 3GPP (4G) LTE (Long-Term Evolution) or 3GPP 5G NR (New Radio). It is however appreciated that example embodiments presented herein are not limited to these example networks and may be applied in any present or future wireless communication networks, or combinations thereof, for example other type of cellular networks, short-range wireless networks, multicast networks, or the like.

Figure 2:
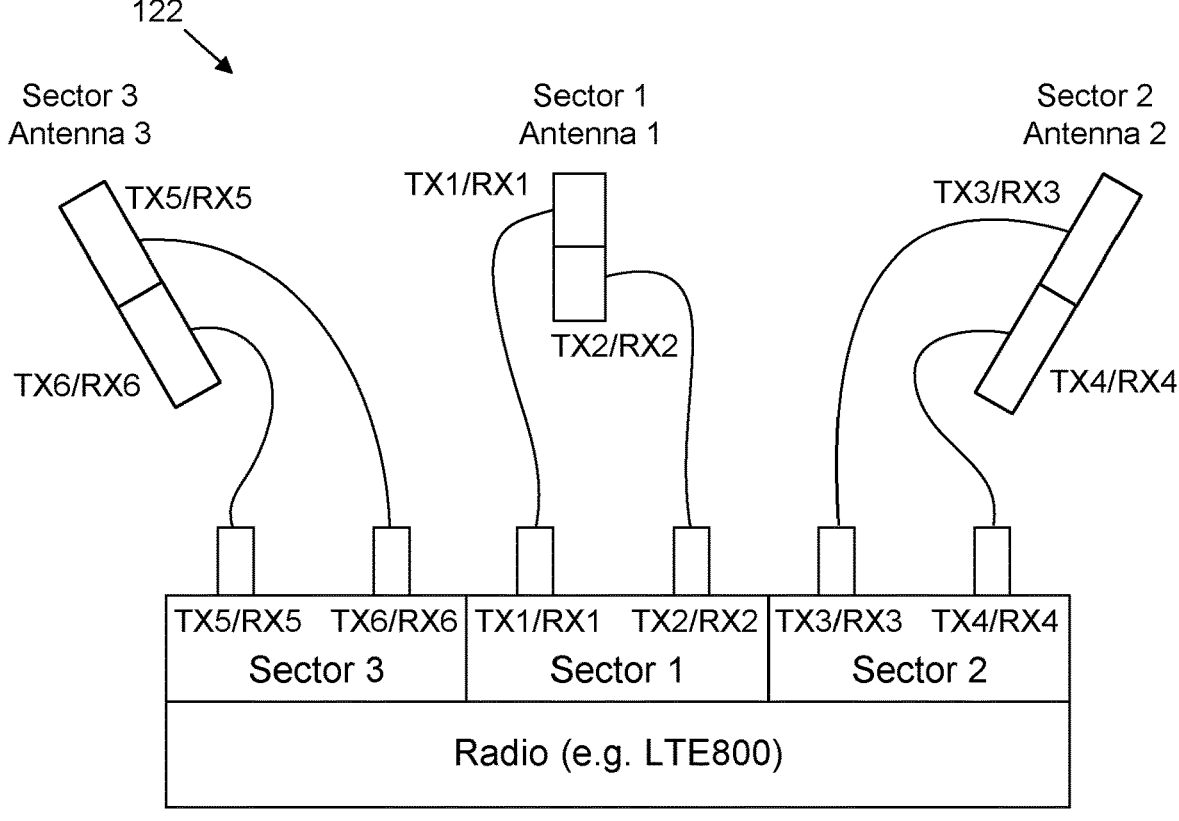
FIG. 2 illustrates an example of an access node.

FIG. 2 illustrates an example of an access node. Access node may be located at a transmission site. Access node may comprise a cellular radio, such as for example an LTE800 radio. A radio may be a subsystem of an access node (e.g. base station), from which an electromagnetic signal is transmitted towards antenna(s) of the access node. In this example, access node 122 is located at a site configured with three sectors. However, any suitable number of sectors may be used. A sector may be defined by antenna(s) directed to a particular direction. A sector may comprise one or a plurality of cells, for example at different frequency layers, pointing to the same direction.

For example, a first sector (Sector 1) may be served by two antenna ports (TX1/RX1, TX2/RX2) connected to a first antenna (Antenna 1). A second sector (Sector 2) may be served by two antenna ports (TX3/RX3, TX4/RX4) connected to a second antenna (Antenna 2). A third sector (Sector 3) may be served by two antenna ports (TX5/RX5, TX5/RX5) connected to a third antenna (Antenna 3). Antennas of the transmission site may be tilted to control the coverage area of the associated cell/sector. Tilting of each antenna may be remotely controlled, for example by network automation system 140. Such feature may be called remote tilting (RET).

One or a plurality of cells may be connected to the same antenna port. Hence, if cells sharing the same antenna port suffer from bad performance, e.g. low CQI, network automation system 140 may determine that the associated port or related antenna element(s) may be broken. One or plurality of cells may share the same radio. Hence, one radio unit may serve several cells. If bad performance is detected at all or a subset of cells sharing the same radio, network automation system 140 may determine that there may be an issue with performance of the radio. Furthermore, if bad performance is detected at all or a subset of the cells within a sector, network automation system 140 may determine that the sector may have a completely faulty antenna. If the entire site is suffering from bad performance, network automation system 140 may determine that the location of the site or antennas (e.g. height) is not optimal. Network automation system 140 may then determine counteraction(s) for remedying the above anomalies, as will be further described below.

FIG. 3 illustrates an example of transmission sites and sectors of radio access network. RAN 120 may comprise four transmissions sites (Sites 1 to 4). Each site may comprise an access node configured to serve cells at three sectors illustrated by the diagonally dashed triangles. As an example, network automation system 140 may detect an anomaly at a cell, which may belong to sector 301 of Site 1 and determine a corresponding counteraction for this cell (e.g. remote tilting of antenna of sector 301). Network automation system 140 may then determine other cell(s) impacted by this counteraction. The cell for which the counteraction, or a set of counteractions, is performed may be called a first cell. The cells determined to be impacted by the counteraction(s) may be called second cells.

Another cell may be determined to belong to the impacted cells, based on determining that the other cell shares an antenna or radio with the first cell. Another cell may be also determined to belong to the impacted cells, if the other cell is within the same sector or beam as the first cell. Furthermore, the other cell may be determined to be an impacted cell, if it's at the same centre frequency with the first cell, or more generally, overlaps in frequency with the first cell.

Furthermore, another cell may be determined to be an impacted cell, if a timing advance of the other cell is above (or equal) to a threshold. Timing advance may be used to align UE transmissions such that they do not interfere with each other (overlap in time) when received by the access node. Impacted cell(s) may be located within the main beam of an antenna at a certain distance. The distance may be calculated from the timing advance, which is another example of KPI. For example, other cells (having same frequency) that are within the main beam and closer than an n-th percentile (e.g. 90th percentile) on timing advance, may be considered as impacted cells. Hence, cells which are located within a threshold distance from the first cell may be considered as impacted cells. The threshold distance may correspond to a distance for which n percent (e.g. 90%) of the timing advance values of the first cell correspond to locations closer than the threshold distance. The threshold distance may be measured from the access node of the first cell. Impacted cells may therefore include cell(s) of the same site.

Impacted cells may also include cells of other site(s). For example, cell(s) located within a certain distance at the antenna direction (e.g. within an angular range from the antenna direction) of the first cell may be considered as impacted cells. For example, cells belonging to all sectors of Site 3 may be identified as impacted cells, because they are located within the angular range θ from antenna direction 302 and at distance $d_3$, which is lower than a threshold distance $d_{th}$. However, only cells belonging to two sectors of Site 2 may be considered as impacted cells, because even if distance $d_2$ is lower than the threshold distance $d_{th}$, one sector of Site 2 is outside the angular range θ. On the other hand, any cells of Site 4 may not be considered as impacted cells, because even if Site 4 is within the angular range θ, the distance between Site 1 and Site 4 is higher the threshold distance $d_{th}$.

FIG. 4 illustrates an example of a CQI-based network optimization method. The network optimization method may be implemented for example at network automation system 140. This method may be considered as a general workflow for the network optimization. The network optimization may be based on KPIs, such as for example CQI, timing advance, or reference signal received power (RSRP). The method is however not limited to these example KPIs and other features, such as for example amount of data traffic etc., may be used alternatively or additionally. Network automation system 140 may detect an anomaly, for example based on a violation of a threshold set for one or more KPIs. In case of CQI, the anomaly may be detected, if a CQI value of some cell(s) falls below a threshold. Network automation system 140 may further determine a scope of the detected anomaly. It is noted that even though some operations of FIG. 4 have been described using CQI as an example, similar operations may be performed for one or more other KPIs, such as for example the timing advance or RSRP.

At operation 401, network automation system 140 may determine that the scope of the anomaly is a single cell, for example in response to detecting bad CQI in an individual cell.

At operation 402, network automation system 140 may determine that the scope of the anomaly is one antenna port, for example in response to detecting bad CQI in cells sharing an antenna port.

At operation 403, network automation system 140 may determine that the scope of the anomaly is a radio, for example in response to detecting bad CQI in cells sharing a particular radio.

At operation 404, network automation system 140 may determine that the scope of the anomaly is one sector, for example in response to detecting bad CQI in multiple (e.g. all) cells of a sector.

At operation 405, network automation system 140 may determine that the scope of the anomaly is one site, for example in response to detecting bad CQI in multiple (e.g. all) cells of a site.

Network automation system 140 may the determine a counteraction based on the determined scope of the anomaly. Network automation system 140 may cause performance of the counteraction, for example by transmitting a request to automatically perform the counteraction at the first cell, cf. remote antenna tilting, or by providing an indication of the counteraction for performance of the counteraction by a human user. In the latter case, the indication of the counteraction may comprise an automated service ticket. The automated service ticket may be for example output to a log of service tickets, transmitted to a terminal of the user, or displayed on a display.

At operation 411, the counteraction may comprise changing an antenna tilt of the first cell. This counteraction may be performed if the scope of the anomaly comprises a single cell. Antenna tilting may be gradual such that it comprises a first antenna tilting step, a second antenna tilting step, and optionally further antenna tilting steps. Each individual antenna tilting step may be considered as an individual counteraction, which may be verified at operation 421 before the next antenna tilting step.

At operation 412, the counteraction may comprise checking or replacing at least one antenna element associated with an antenna port. This counteraction may be performed if the scope of the anomaly comprises the antenna port.

At operation 413, the counteraction may comprise checking or replacing a radio. This counteraction may be performed if the scope of the anomaly comprises cells sharing the radio, e.g., cells being served by the same radio unit.

At operation 414, the counteraction may comprise checking or replacing components (e.g. hardware) that is common to cells of a sector, for example cable(s), diplexer(s), or the like. This counteraction may be performed if the scope of the anomaly comprises a sector of an access node.

At operation 415, the counteraction may comprise providing an indication of a need to replan location of the access node (site). This counteraction may be performed if the scope of the anomaly comprises the access node.

It is however noted that more than one counteraction may be performed for a certain scope of the anomaly. For example, network automation system 140 may determine to change the antenna tilt regardless of the scope of the anomaly. In many cases the antenna tilt may be the root cause for the anomaly (e.g. bad CQI). And, even if other root causes were expected, testing the impact of antenna tilting may be beneficial, because it is an inexpensive way for correcting anomalies, if remote tilting is available. Other counteractions, such as replacing hardware may be more expensive than tilting.

The verification flow may comprise a series of decisions for determining whether a counteraction solved the detected anomaly. To verify the counteraction, performance indicator(s), e.g. KPI(s), may be collected before and after performance of the counteraction. The verification flow may be hierarchical such that counteractions are performed in an ordered sequence of counteractions. The sequence of counteractions may comprise counteractions of operations 411 to 415, for example in this order. Each operation of the verification flow may be performed in response performance of a respective counteraction. Operations of the verification flow may comprise determining whether performance of the network was improved, maintained, or degraded, either considering the first cell or both the first cell and the impacted cells, as will be further described with reference to FIG. 5. Each operation of the verification flow may be followed by performance of the next counteraction in the sequence of counteractions, followed by another verification step.

At operation 421, network automation system 140 may determine whether the counteraction of antenna tilting can be verified. If yes, the counteraction may be verified, and execution of the method may move to operation 431. If the counteraction of antenna tilting cannot be verified, the next counteraction of checking/replacing the antenna may be performed.

At operation 422, network automation system 140 may determine whether the counteraction of checking/replacing the antenna can be verified. If yes, the counteraction may be verified, and execution of the method may move to operation 431. If the counteraction of checking/replacing the antenna cannot be verified, the next counteraction of checking/replacing the radio antenna may be performed.

At operation 423, network automation system 140 may determine whether the counteraction of checking/replacing the radio can be verified. If yes, the counteraction may be verified, and execution of the method may move to operation 431. If the counteraction of checking/replacing the radio cannot be verified, the next counteraction of checking/replacing other hardware (HW), e.g. components common to the sector such as cabling or diplexers, may be performed.

At operation 424, network automation system 140 may determine whether the counteraction of checking/replacing the other hardware can be verified. If yes, the counteraction may be verified, and execution of the method may move to operation 431. If the counteraction of checking/replacing the other hardware cannot be verified, the next counteraction of replanning the site location may be requested.

At operation 425, network automation system 140 may determine whether the counteraction of replanning the site location can be verified. If yes, the counteraction may be verified, and execution of the method may move to operation 431. If not, execution of the method may move to operation 432.

At operation 431, network automation system 140 may determine that at least one of the counteractions 411 to 415 was verified. An indication of successful verification of the counteraction may be output, for example via a (remote) user interface such as for example a display. This operation may be in response to detecting, or receiving an indication of, improved or maintained network performance during the last performed operation of the verification flow, e.g. operation 421 if the counteraction of antenna tilting of operation 411 was verified.

At operation 432, network automation system 140 may determine that none of the counteractions 411 to 415 was verified. An indication of unsuccessful verification of the counteraction may be output, for example via the (remote) user interface. This operation may be in response to detecting, or receiving an indication of, degraded network performance provided during the last operation of the verification flow, e.g. operation 425.

It is noted that even if certain operations are illustrated in FIG. 4, some of the operations may not be present in all example embodiments. For example, the conclusion of not being able to verify the counteraction may be made after any of operations 421 to 425, if only a subset of operations 421 to 425 is present. For example, changing the antenna tilt (operation 411) could be configured as the only available counteraction. It is also possible to perform more than one counteraction and verify this set of counteractions together, based on performance indicator values before and after the set of counteractions.

Figure 5:
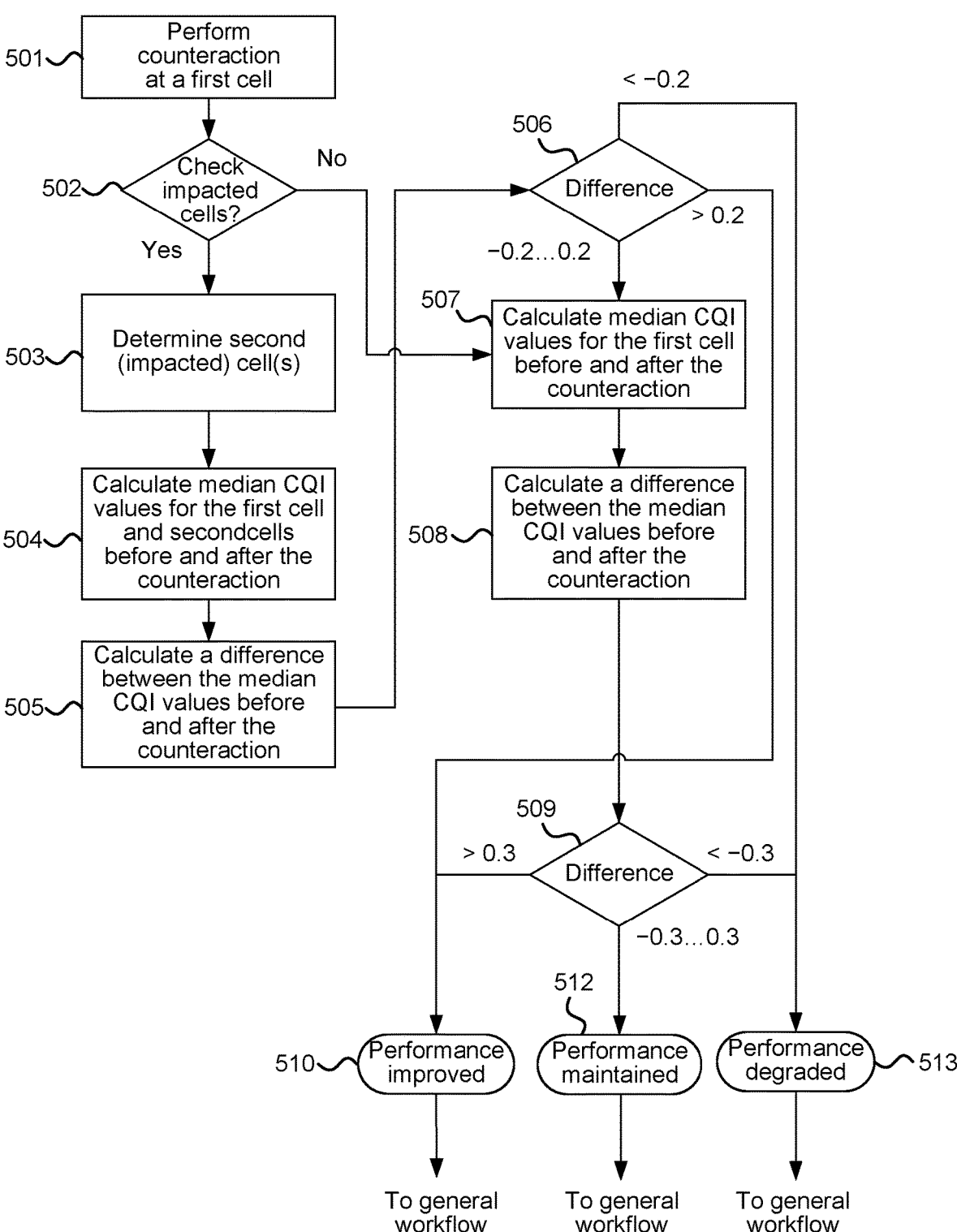
FIG. 5 illustrates an example of a method for verifying a counteraction.

FIG. 5 illustrates an example of a method for verifying a counteraction. The method may be performed at any operation of the verification flow, for example any of operations 421 to 425. Even though this method is described using CQI as an example, the method may be performed similarly for any suitable performance indicator(s).

At operation 501, network automation system 140 may perform, or cause performance of, a counteraction at a first cell, for example as described with reference to operations 411 to 415.

At operation 502, network automation system 140 may check whether second cells (impacted cells) are to be checked. Depending on settings of network automation system 140, it may be configured to consider the impact of the counteraction(s) for other cells, or, to verify the counteraction(s) based only on performance indicators of the first cell. If the second cells are to be considered, network automation system 140 may move to execution of operation 503. If not, network automation system 140 may move to execution of operation 507.

At operation 503, network automation system may determine the second cell(s) impacted by the counteraction. As described above with reference to FIG. 3, another cell may be identified as an impacted cell, for example if the other cell shares an antenna of the first cell or a radio of the first cell, if the other cell is within the same sector or beam as the first cell, if the other cell overlaps in frequency with the first cell, if the timing advance of the other cell is within a range from the timing advance of the first cell, or is the other cell is within a threshold distance from the first cell and also within a certain angular range from an antenna direction of the first cell. One or more of the above criteria may be also combined. For example, network automation system 140 may identify the other cell as an impacted cell, if a subset (e.g. a pair) of the above criteria is satisfied.

At operation 504, network automation system 140 may calculate median CQI values for the first cell and the second cell(s) before and after the counteraction. Network automation system 140 may obtain first CQI values of the first cell and/or the second cell(s). The first CQI values may be collected before the counteraction. The first CQI values may be therefore associated with a first time period, which is before performance of the counteraction. Network automation system 140 may further obtain second CQI values of the first cell and/or the second cell(s). The second CQI values may be collected after the counteraction. The second CQI values may be therefore associated with a second time period, which is after performance of the counteraction. The first time period may for example comprise a week before the counteraction(s). The second time period may for example comprise a week after the counteraction. The day of the counteraction may not be included in the first or second time period. The first time period may thus end on the day before the day of the counteraction. The second time period may begin on the next day from the day of the counteraction. As noted above, CQI is provided as one example of a performance indicator. It is also possible to use another statistical operator (e.g. averaging) instead of median. Using median may be however beneficial, because it enables to filter out spurious CQI changes occurring at the network independent of the counteraction.

At operation 505, network automation system 140 may calculate a difference between the first and second CQI values, e.g. the median values before and after the counteraction(s). This difference may be called a first difference.

At operation 506, network automation system 140 may determine whether the calculated (first) difference is higher than (or equal) to a first threshold, for example 0.2. If the difference is higher than (or equal) to the first threshold, network automation system 140 may provide an indication of improved network performance at operation 510. Network automation system 140 may also determine whether the calculated difference is lower than (or equal) to a second threshold, for example −0.2. If the difference is lower than (or equal) to the second threshold, network automation system 140 may provide an indication of degraded network performance at operation 513. If the difference is lower than (or equal) to the first threshold, but higher than (or equal) to the second threshold, network automation system 140 may move to execution of operation 507, in order to further analyse impact of the counteraction(s) based on the first cell, without considering the second cell(s). This enables network automation system 140 to concentrate on changes at the first cell, when no significant performance change is detected with the second cell(s).

At operation 507, network automation system 140 may calculate median CQI values for the first cell. This operation may be similar to operation 504, but without considering the second cell(s), resulting in first and second CQI values of the first cell, corresponding to first and second time periods before and after the counteraction, respectively.

At operation 508, network automation system 140 may calculate a difference between the first and second CQI values of the first cell, e.g. the median values before and after the counteraction(s). This difference may be called a second difference.

At operation 509, network automation system 140 may determine whether the calculated (second) difference is higher than (or equal) to a third threshold, for example 0.3. If the difference is higher than (or equal) to the third threshold, network automation system 140 may provide the indication of improved network performance at operation 510. Network automation system 140 may also determine whether the calculated difference is lower than (or equal) to a fourth threshold, for example –0.3. If the difference is lower than (or equal) to the fourth threshold, network automation system 140 may provide the indication of degraded network performance at operation 513. If the difference is lower than (or equal) to the third threshold, but higher than (or equal) to the fourth threshold, network automation system 140 may provide an indication of (substantially) maintained network performance at operation 512.

Any suitable thresholds may be used. The third threshold (0.3 in the example of FIG. 5) may be higher than the first threshold (0.2). The fourth threshold (–0.3) may be lower than the first threshold (–0.2). This requires the change in performance of the first cell to be higher than the change considering also the second cells, before determining the performance to be improved or degraded. Hence, less significant changes at the second cells, some of which may be located at a distance from the first cell, will be taken into account at operation 506. It is also possible to configure operation 506 or 509 to operate based on a single threshold (e.g. 0) to determine whether network performance was degraded (<0) or improved (>0).

From operations 510, 512, and 513, network automation system 140 may move back to execution of the general workflow of FIG. 4. For example, the counteraction may be reversed, in response to determining that the counteraction was not verified (e.g. based on the indication of degraded network performance). The counteraction may be maintained, in response to determining that the counteraction was verified (e.g. based on the indication of improved network performance).

Figure 6:
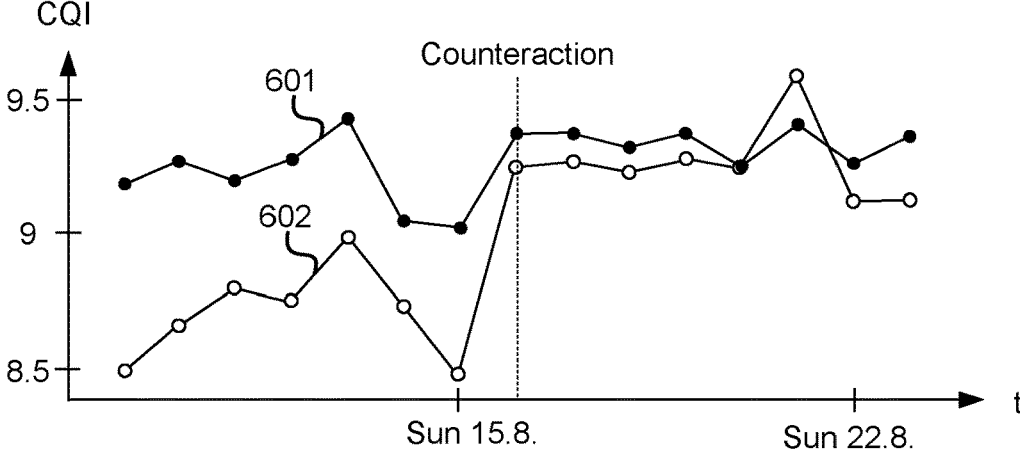
FIG. 6 illustrates an example of improved network performance in terms of CQI.

FIG. 6 illustrates an example of improved network performance in terms of CQI. In this example, the median CQI of the impacted cells (601) is not significantly affected by the counteraction. However, the counteraction causes the median CQI of the first cell (602) to increase more than 0.3, which resulting in verification of the counteraction due to improved network performance.

Figure 7:
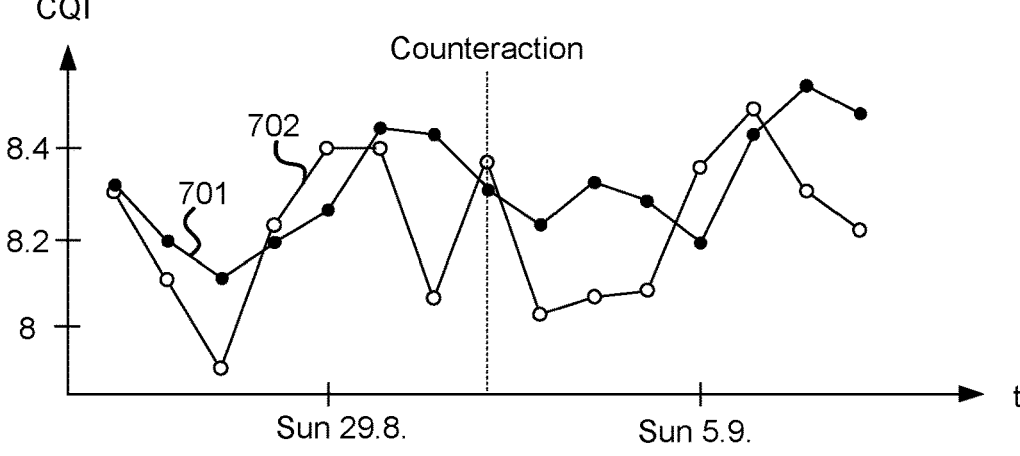
FIG. 7 illustrates an example of substantially maintained network performance in terms of CQI.

FIG. 7 illustrates an example of substantially maintained network performance in terms of CQI. In this example, neither the median CQI of the impacted cells (701) nor the median CQI of the first cell (702) is significantly affected by the counteraction, resulting in the indication of substantially maintained network performance. The counteraction may be either maintained or reversed based on this indication.

Maintaining the counteraction in case of substantially maintained network performance enables to avoid further unnecessary reconfigurations in the network.

Figure 8:
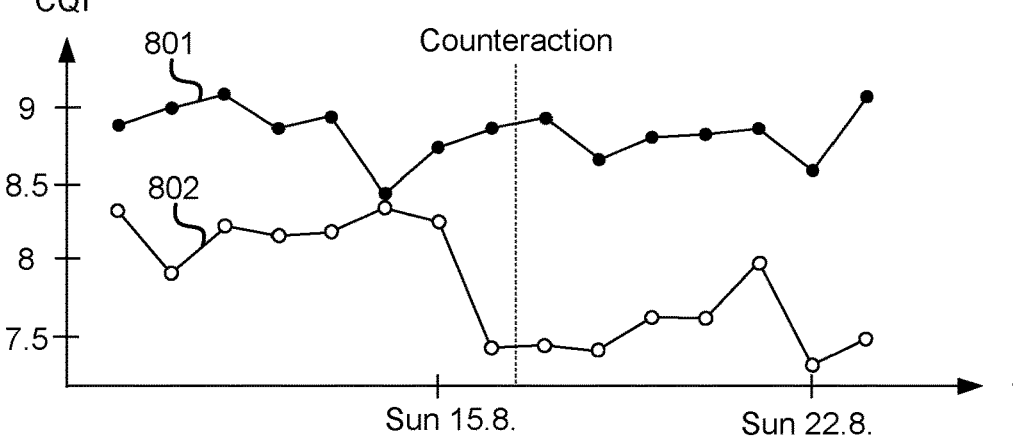
FIG. 8 illustrates an example of degraded network performance in terms of CQI.

FIG. 8 illustrates an example of degraded network performance in terms of CQI. In this example, the median CQI of the impacted cells (801) is not significantly affected by the counteraction. However, the counteraction causes the median CQI of the first cell (602) to decrease more than 0.3, resulting in not being able to verify the counteraction due to the degraded network performance.

Figure 9:
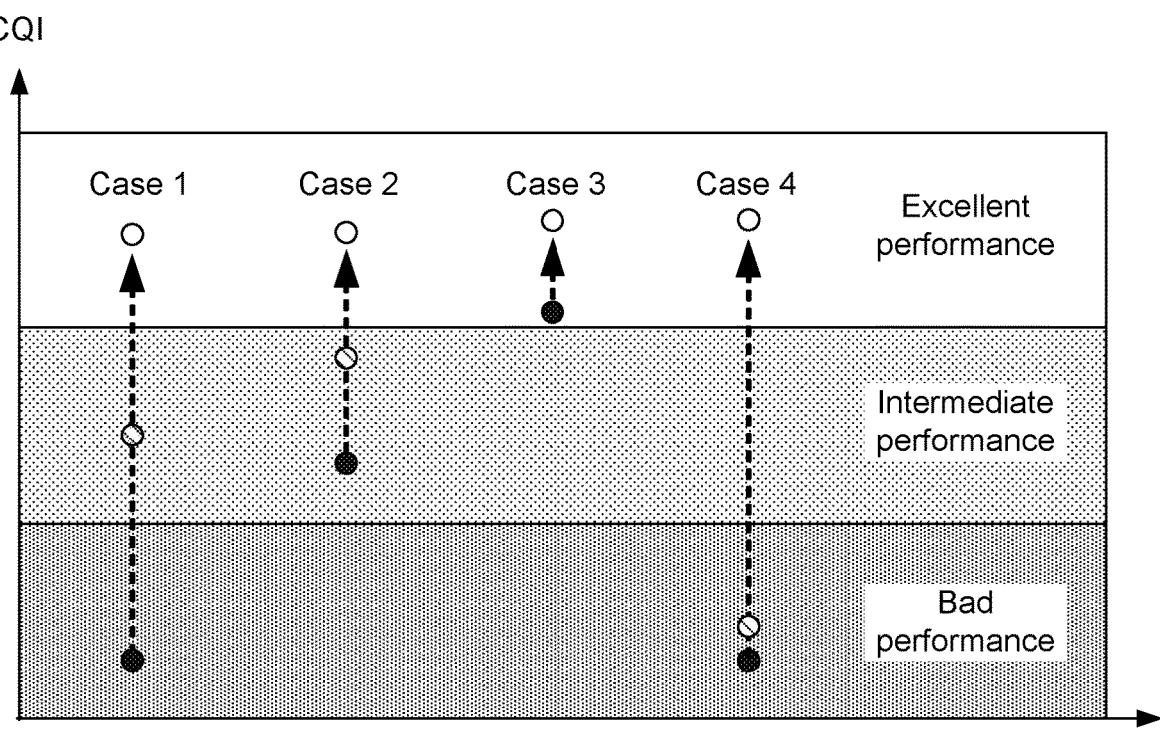
FIG. 9 illustrates examples of an impact of counteraction(s) to CQI.

FIG. 9 illustrates examples of an impact of counteraction(s) to CQI. Performance before any counteraction is illustrated with the black circles. Performance after counteraction(s), antenna tilting in this example, is illustrated with diagonally dashed circles and white circles.

Case 1 relates to cells initially suffering from bad performance in terms of CQI. After antenna tilting the performance is improved to intermediate performance. The initially bad CQI performance may be therefore due to many users being located near the cell edge. By knowing this, the tilting may be continued, and performance may be improved an excellent level Case 2 relates to cells initially having intermediate performance. First antenna tilting improves the performance, and by detecting this, the tilting may be continued, and the performance may be improved to the excellent level.

Case 3 relates to cells for which the performance is initially good. However, as some users may be located at the cell edge, antenna tilting may further improve the performance.

Case 4 relates to cells initially suffering from bad performance in terms of CQI. In this case, after first antenna tilting, network automation system 140 may detect that timing advance has changed but the performance is still bad. Based on this network automation system 140 may determine that the bad CQI is not caused by layer edge in traffic area, but rather by some hardware problem. Since the first counteraction of antenna tilting cannot be verified (due to not improved performance), an automated service ticket may be output to request further analysis and replacement of any RF component(s) causing the bad performance.

Figure 10:
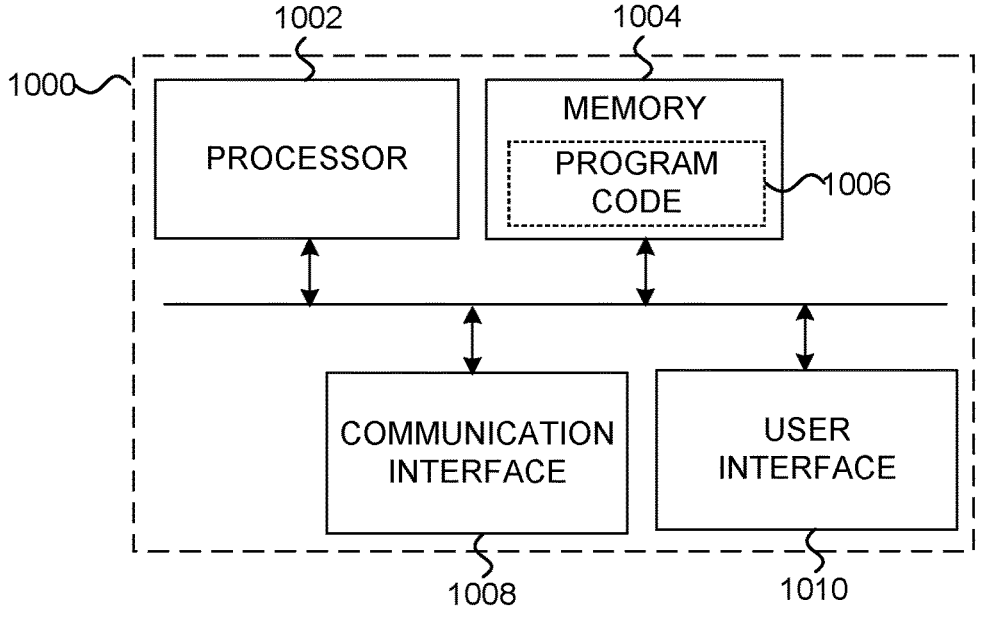
FIG. 10 illustrates an example of an apparatus configured to practise one or more example embodiments.

FIG. 10 illustrates an example embodiment of an apparatus 1000, for example a server, configured to perform one or more example embodiments. Apparatus 1000 may be for example used to implement network automation system 140. Apparatus 1000 may comprise at least one processor 1002. The at least one processor 1002 may comprise, for example, one or more of various processing devices or processor circuitry, such as for example a co-processor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like.

Apparatus 1000 may further comprise at least one memory 1004. The at least one memory 1004 may be configured to store, for example, computer program code or the like, for example operating system software and application software. The at least one memory 1004 may comprise one or more volatile memory devices, one or more non-volatile memory devices, and/or a combination thereof. For example, the at least one memory 1004 may be embodied as magnetic storage devices (such as hard disk drives, floppy disks, magnetic tapes, etc.), optical magnetic storage devices, or semiconductor memories (such as mask ROM, PROM (programmable ROM), EPROM (erasable PROM), flash ROM, RAM (random access memory), etc.).

Apparatus 1000 may further comprise a communication interface 1008 configured to enable apparatus 1000 to transmit and/or receive information to/from other devices, functions, or entities. In one example, apparatus 1000 may use communication interface 1008 to transmit or receive information over the SBI message bus of 5GC 130, internal interfaces of EPC 230, or a network interconnection interface between different networks (e.g. 5GC 130 and EPC 230).

When apparatus 1000 is configured to implement some functionality, some component and/or components of apparatus 1000, such as for example the at least one processor 1002 and/or the at least one memory 1004, may be configured to implement this functionality. Furthermore, when the at least one processor 1002 is configured to implement some functionality, this functionality may be implemented using program code 1006 comprised, for example, in the at least one memory 1004.

The functionality described herein may be performed, at least in part, by one or more computer program product components such as for example software components. According to an embodiment, the apparatus comprises a processor or processor circuitry, such as for example a microcontroller, configured by the program code when executed to execute the embodiments of the operations and functionality described. A computer program or a computer program product may therefore comprise instructions for causing, when executed, apparatus 1000 to perform the method(s) described herein. Alternatively, or in addition, the functionality described herein can be performed, at least in part, by one or more hardware logic components. For example, and without limitation, illustrative types of hardware logic components that can be used include Field-programmable Gate Arrays (FPGAs), application-specific Integrated Circuits (ASICs), application-specific Standard Products (ASSPs), System-on-a-chip systems (SOCs), Complex Programmable Logic Devices (CPLDs), Graphics Processing Units (GPUs).

Apparatus 1000 comprises means for performing at least one method described herein. In one example, the means comprises the at least one processor 1002, the at least one memory 1004 including program code 1006 configured to, when executed by the at least one processor, cause the apparatus 1000 to perform the method.

Apparatus 1000 may comprise a computing device such as for example an access point, a base station, a server, a network device, a network function device, or the like. Although apparatus 1000 is illustrated as a single device it is appreciated that, wherever applicable, functions of apparatus 1000 may be distributed to a plurality of devices, for example to implement example embodiments as a cloud computing service.

Figure 11:
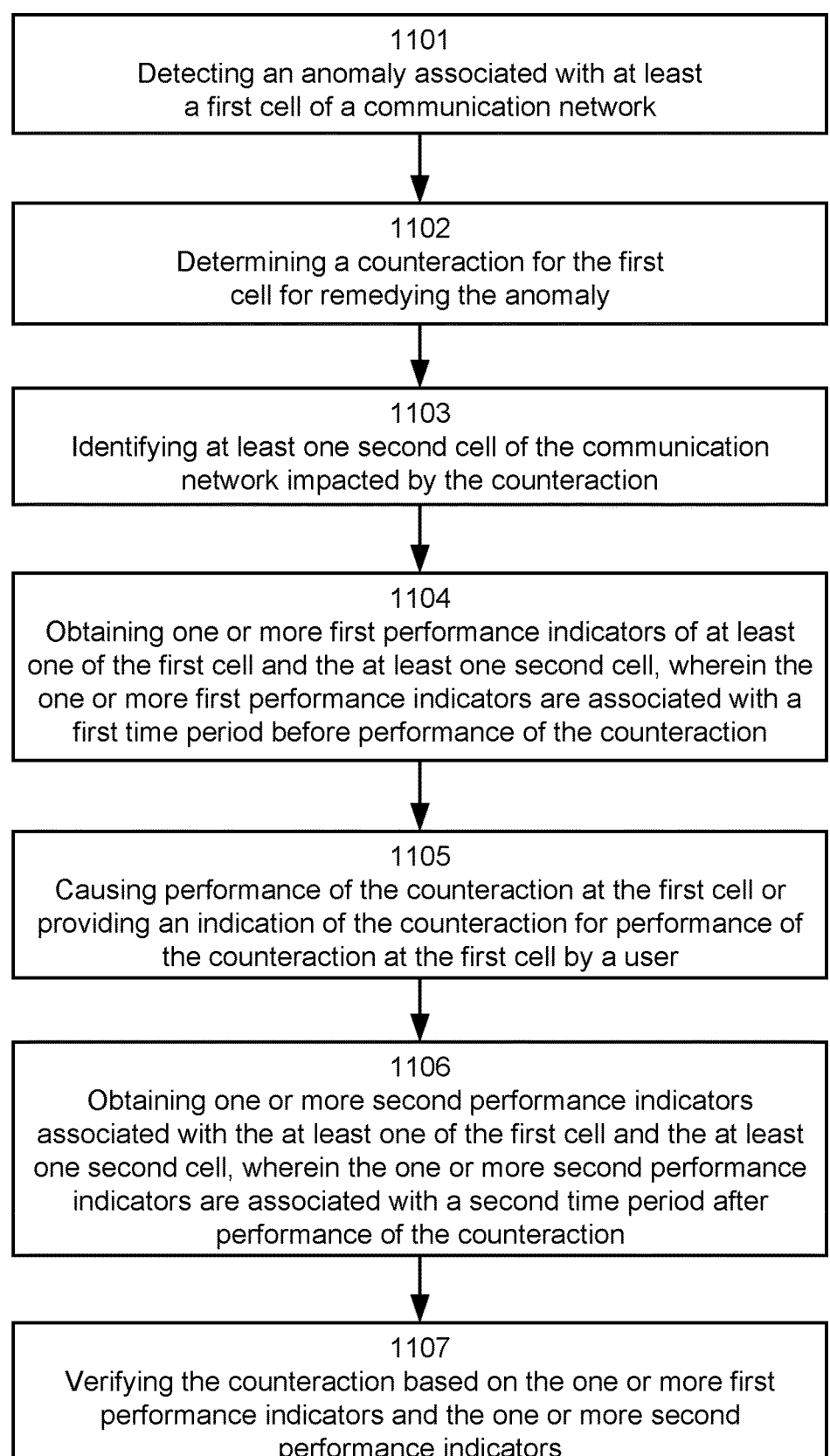
FIG. 11 illustrates an example of a method for determining a counteraction for remedying an anomaly in a communication network.

FIG. 11 illustrates an example of a computer-implemented method for determining a counteraction for remedying an anomaly in a communication network.

At 1101, the method may comprise detecting an anomaly associated with at least a first cell of a communication network.

At 1102, the method may comprise determining a counteraction for the first cell for remedying the anomaly.

At 1103, the method may comprise identifying at least one second cell of the communication network impacted by the counteraction.

At 1104, the method may comprise obtaining one or more first performance indicators of at least one of the first cell and the at least one second cell, wherein the one or more first performance indicators are associated with a first time period before performance of the counteraction.

At 1105, the method may comprise causing performance of the counteraction at the first cell or providing an indication of the counteraction for performance of the counteraction at the first cell by a user.

At 1106, the method may comprise obtaining one or more second performance indicators associated with the at least one of the first cell and the at least one second cell, wherein the one or more second performance indicators are associated with a second time period after performance of the counteraction.

At 1107, the method may comprise verifying the counteraction based on the one or more first performance indicators and the one or more second performance indicators.

Further features of the method directly result for example from the functionalities of network automation system 140, as described throughout the specification and in the appended claims and are therefore not repeated here. Different variations of the method may be also applied, as described in connection with the various example embodiments.

An apparatus, such as for example a network device configured to implement one or more network functions or entities, may be configured to perform or cause performance of any aspect of the method(s) described herein. Further, a computer program or a computer program product may comprise instructions for causing, when executed, an apparatus to perform any aspect of the method(s) described herein. Further, an apparatus may comprise means for performing any aspect of the method(s) described herein. According to an example embodiment, the means comprises at least one processor, and memory including program code, the at least one processor, and program code configured to, when executed by the at least one processor, cause performance of any aspect of the method(s).

Any range or device value given herein may be extended or altered without losing the effect sought. Also, any embodiment may be combined with another embodiment unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item may refer to one or more of those items.

The steps or operations of the methods described herein may be carried out in any suitable order, or simultaneously where appropriate. Additionally, individual blocks may be deleted from any of the methods without departing from the scope of the subject matter described herein. Aspects of any of the example embodiments described above may be combined with aspects of any of the other example embodiments described to form further example embodiments without losing the effect sought.

The term 'comprising' is used herein to mean including the method, blocks, or elements identified, but that such blocks or elements do not comprise an exclusive list and a method or apparatus may contain additional blocks or elements.

Although subjects may be referred to as 'first' or 'second' subjects, this does not necessarily indicate any order or importance of the subjects. Instead, such attributes may be used solely for the purpose of making a difference between subjects.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from scope of this specification.

The invention claimed is:

1. A computer-implemented method, comprising:
detecting an anomaly associated with at least a first cell of a communication network;
determining, based on a channel quality indicator, a common nominator for the anomaly in terms of antenna port, radio unit, sector of transmission site, or transmission site;
determining, based on the common nominator, a counteraction for the first cell for remedying the anomaly;
identifying at least one second cell of the communication network impacted by the counteraction;
obtaining one or more first performance indicators of at least the one of the first cell and the at least one second cell, wherein the one or more first performance indicators are associated with a first time period before performance of the counteraction;
causing performance of the counteraction at the first cell or providing an indication of the counteraction for performance of the counteraction at the first cell by a user;
obtaining one or more second performance indicators associated with the at least one of the first cell and the at least one second cell, wherein the one or more second performance indicators are associated with a second time period after performance of the counteraction, wherein the first and second performance indicators comprise values of the channel quality indicator; and
verifying the counteraction based on the one or more first performance indicators and the one or more second performance indicators.

2. The method according to claim 1, further comprising:
determining the counteraction based on a scope of the anomaly.

3. The method according to claim 2, wherein the scope of the anomaly comprises a single cell and the counteraction comprises changing an antenna tilt of the first cell, the scope of the anomaly comprises a plurality of cells sharing an antenna port and the counteraction comprises replacement of at least one antenna element associated with the antenna port, the scope of the anomaly comprises a plurality of cells sharing a radio and the counteraction comprises replacement of the radio, the scope of the anomaly comprises a sector of an access node and the counteraction comprises replacement of components common to cells of the sector, or the scope of the anomaly comprises the access node and the counteraction comprises providing an indication of a need to replan location of the access node.

4. The method according to claim 1, wherein identifying the at least one second cell is based on determining that the at least one second cell shares an antenna of the first cell or a radio of the first cell.

5. The method according to claim 4, wherein identifying the at least one second cell is further based on at least one of:
determining that the at least one second cell is within the same sector or beam as the first cell,
determining that the at least one second cell overlaps in frequency with the first cell, or
determining that the at least one second cell is within a threshold distance from the first cell, the threshold distance corresponding to an n-th percentile of timing advance values of the first cell.

6. The method according to claim 1, wherein verifying the counteraction comprises:
calculating a first difference between the one or more first performance indicators and the one or more second performance indicators of the first cell and the at least one second cell; and
providing an indication of improved network performance, in response to determining that the first difference is higher than or equal to a first threshold,
providing an indication of degraded network performance, in response to determining that the first difference is lower than or equal to a second threshold, or
calculating a second difference between the one or more first performance indicators and the one or more second performance indicators of the first cell, in response to determining that the first difference is between the first threshold and the second threshold.

7. The method according to claim 6, wherein verifying the counteraction further comprises:
providing the indication of improved network performance, in response to determining that the second difference is higher than or equal to a third threshold,
providing the indication of degraded network performance, in response to determining the second difference to be lower than or equal to a fourth threshold, or
providing an indication of substantially maintained network performance, in response to determining the second difference to be between the third threshold and the fourth threshold.

8. The method according to claim 6, further comprising:
reversing the counteraction, in response to the indication of degraded network performance, or
maintaining the counteraction, in response to the indication of improved network performance.

9. The method according to claim 1, wherein detecting the anomaly is based on at least one key performance indicator of the first cell.

10. The method according to claim 9, wherein the at least one key performance indicator of the first cell comprises at least one of: a channel quality indicator, a timing advance, or a reference signal received power.

11. The method according to claim 1, wherein the first and second performance indicators comprise median values of the channel quality indicator.

12. The method according to claim 1, wherein the indication of the counteraction for performance of the counteraction at the first cell by a user comprises an automated service ticket.

13. An apparatus comprising:

at least one processor; and at least one memory including computer program code;

the at least one memory and the computer code configured to, with the at least one processor, cause the apparatus at least to:

detect an anomaly associated with at least a first cell of a communication network;

determine, based on a channel quality indicator, a common nominator for the anomaly in terms of antenna port, radio unit, sector of transmission site, or transmission site;

determine, based on the common nominator, a counteraction for the first cell for remedying the anomaly;

identify at least one second cell of the communication network impacted by the counteraction;

obtain one or more first performance indicators of at least the one of the first cell and the at least one second cell, wherein the one or more first performance indicators are associated with a first time period before performance of the counteraction;

cause performance of the counteraction at the first cell or providing an indication of the counteraction for performance of the counteraction at the first cell by a user;

obtain one or more second performance indicators associated with the at least one of the first cell and the at least one second cell, wherein the one or more second performance indicators are associated with a second time period after performance of the counteraction, wherein the first and second performance indicators comprise values of the channel quality indicator; and verify the counteraction based on the one or more first performance indicators and the one or more second performance indicators.

14. A computer program stored on a non-transitory storage, the computer program comprising program code configured to, when executed by a processor, cause an apparatus at least to:

detect an anomaly associated with at least a first cell of a communication network;

determine, based on a channel quality indicator, a common nominator for the anomaly in terms of antenna port, radio unit, sector of transmission site, or transmission site;

determine, based on the common nominator, a counteraction for the first cell for remedying the anomaly;

identify at least one second cell of the communication network impacted by the counteraction;

obtain one or more first performance indicators of at least one of the first cell and the at least one second cell, wherein the one or more first performance indicators are associated with a first time period before performance of the counteraction;

cause performance of the counteraction at the first cell or providing an indication of the counteraction for performance of the counteraction at the first cell by a user;

obtain one or more second performance indicators associated with the at least the one of the first cell and the at least one second cell, wherein the one or more second performance indicators are associated with a second time period after performance of the counteraction, wherein the first and second performance indicators comprise values of the channel quality indicator; and verify the counteraction based on the one or more first performance indicators and the one or more second performance indicators.

* * * * *